(12) United States Patent
Visbalmendoza (10) Patent No.: US 12,456,727 B2
(45) Date of Patent: Oct. 28, 2025

(54) COATED ANODE ACTIVE MATERIAL AND ALL SOLID STATE BATTERY

(71) Applicant: TOYOTA JIDOSHA KABUSHIKI KAISHA, Toyota (JP)

(72) Inventor: Heidyhodex Visbalmendoza, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 566 days.

(21) Appl. No.: 17/902,291

(22) Filed: Sep. 2, 2022

(65) Prior Publication Data
US 2023/0079447 A1    Mar. 16, 2023

(30) Foreign Application Priority Data
Sep. 13, 2021 (JP) ................. 2021-148503

(51) Int. Cl.
 *H01M 4/38* (2006.01)
 *H01M 4/36* (2006.01)
 *H01M 4/485* (2010.01)

(52) U.S. Cl.
 CPC ........... *H01M 4/386* (2013.01); *H01M 4/366* (2013.01); *H01M 4/485* (2013.01)

(58) Field of Classification Search
 CPC ....... H01M 4/366; H01M 4/386; H01M 4/485
 See application file for complete search history.

(56) References Cited

U.S. PATENT DOCUMENTS

| | | | |
|---|---|---|---|
| 2009/0004563 A1* | 1/2009 | Zhong | H01M 4/485 429/188 |
| 2013/0059203 A1 | 3/2013 | Hong et al. | |
| 2013/0337314 A1* | 12/2013 | Essaki | H01M 4/134 429/163 |
| 2020/0099044 A1 | 3/2020 | Nagase | |
| 2020/0395618 A1* | 12/2020 | Rangasamy | H01M 4/628 |

FOREIGN PATENT DOCUMENTS

| | | |
|---|---|---|
| CN | 109935805 A | 6/2019 |
| JP | 2013-528907 A | 7/2013 |
| JP | 2015-079727 A | 4/2015 |
| JP | 2020-53154 A | 4/2020 |

* cited by examiner

*Primary Examiner* — Aiqun Li
(74) *Attorney, Agent, or Firm* — Oliff PLC (57) ABSTRACT

A main object of the present disclosure is to provide a coated anode active material capable of preventing the reaction resistance from increasing during high cycles. The present disclosure achieves the object by providing a coated anode active material including: a Si-based active material; and a coating layer that coats at least a part of a surface of the Si-based active material and includes a lithium oxide; wherein a silicon oxide layer is formed between the Si-based active material and the coating layer.

6 Claims, 6 Drawing Sheets

Comparative Example 1 (Si particle)

FIG. 4

Example 1 (Coated anode active material)

LTO

COATED ANODE ACTIVE MATERIAL AND ALL SOLID STATE BATTERY

TECHNICAL FIELD

The present disclosure relates to a coated anode active material and an all solid state battery.

BACKGROUND ART

As an anode active material used in an anode layer of a battery, a Si-based active material has been known. Patent Literature 1 discloses an anode active material for a lithium secondary battery comprising an active particle capable of absorbing/releasing lithium ions, and a coating layer coating a surface of the active particle, wherein the coating layer includes a first substance that is a nano hollow fiber, and a second substance that is a carbon precursor or an LTO, and Si is used as the active particle.

Also, an all solid state battery is a battery including a solid electrolyte layer between a cathode active material layer and an anode active material layer, and one of the advantages thereof is that the simplification of a safety device may be more easily achieved compared to a liquid-based battery including a liquid electrolyte containing a flammable organic solvent. Patent Literature 2 describes that the value of discharge capacity with respect to charge capacity is high in charge and discharge test in maximum 30 cycles when at least one kind selected from the group consisting of a carbon, Si and Sn, and $Li_4Ti_5O_{12}$ are used together as an anode active material in an anode mixture for an all solid state battery.

CITATION LIST

Patent Literatures

Patent Literature 1: Japanese Patent Application Laid-Open (JP-A) No. 2013-528907
Patent Literature 2: JP-A No. 2020-53154

SUMMARY OF DISCLOSURE

Technical Problem

The Si-based active material has large theoretical capacity, and thus usage of the Si-based active material may easily allow an all solid state battery to achieve high energy density. Meanwhile, the volume change of the Si-based active material during charge and discharge is large. Therefore, when the Si-based active material is used as an anode active material, cut of path (such as cut-off of ion conducting path and electron conducting path) in the anode active material layer occurs along with charge and discharge cycles/and resistance increase easily occurs; thus, the capacity tends to decrease. For this reason, when the Si-based active material is used as the anode active material, it is required to prevent the reaction resistance from increasing during high cycles.

The present disclosure has been made in view of the above circumstances, and a main object thereof is to provide a coated anode active material capable of preventing the reaction resistance from increasing during high cycles.

Solution to Problem

The present disclosure provides a coated anode active material including: a Si-based active material; and a coating layer that coats at least a part of a surface of the Si-based active material and includes a lithium oxide; wherein a silicon oxide layer is formed between the Si-based active material and the coating layer.

According to the present disclosure, the silicon oxide layer is arranged between the Si-based active material and the coating layer, and thus the adhesiveness of the Si-based active material with the coating layer improves, and a coated anode active material capable of preventing the reaction resistance from increasing during high cycles may be obtained.

In the disclosure, the silicon oxide layer may be amorphous.

In the disclosure, the lithium oxide may be a lithium titanate.

In the disclosure, the lithium titanate may be $Li_4Ti_5O_{12}$.

In the disclosure, the silicon oxide layer may contain a Ti element.

In the disclosure, the coating layer may contain a Si element.

The present disclosure also provides an all solid state battery comprising a cathode active material layer, an anode active material layer, and a solid electrolyte layer formed between the cathode active material layer and the anode active material layer; wherein the anode active material layer contains the above described coated anode active material.

According to the present disclosure, the anode active material layer contains the above described coated anode active material, and thus the all solid state battery in which the increase in the reaction resistance during nigh cycles is inhibited may be obtained.

Advantageous Effects of Disclosure

The present disclosure exhibits an effect of providing a coated anode active material capable of preventing the reaction resistance from increasing during high cycles.

DESCRIPTION OF EMBODIMENTS

A. Coated Anode Active Material

Figure 1:
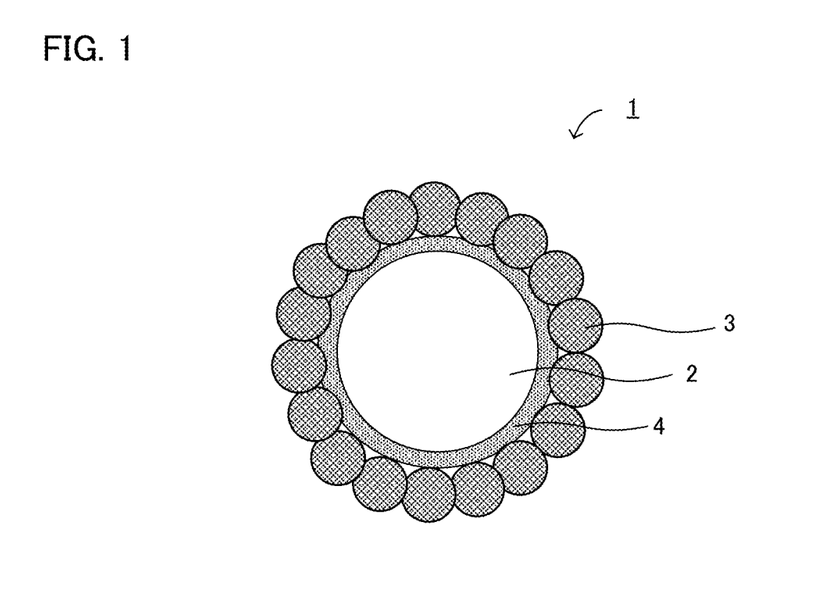
FIG. 1 is a schematic cross-sectional view illustrating an example of the coated anode active material in the present disclosure.

The coated anode active material in the present disclosure will be hereinafter explained in details. FIG. 1 is a schematic cross-sectional view illustrating an example of the coated anode active material in the present disclosure. Coated anode active material 1 illustrated in FIG. 1 includes Si-based active material 2, and coating layer 3 that coats at least a part of a surface of the Si-based active material 2 and includes a lithium oxide; wherein silicon oxide layer 4 is formed between the Si-based active material 2 and the coating layer 3.

According to the present disclosure, at least part of the surface of the Si-based active material is coated with the coating aver including a lithium oxide, and thus the volume change of the coated anode active material may be suppressed. This is because the volume change of the lithium oxide during charge and discharge is smaller than that of the Si-based active material. Further, the silicon oxide layer is formed between the Si-based active material and the coating layer, and thus the adhesiveness of the Si-based active material with the coating layer improves. As a result, the coating layer having lithium ion conductivity follows the expansion and contraction of the Si-based active material, and thereby the cut-off of the ion conducting path and electron conducting path caused by isolation of the Si-based active material is inhibited. Therefore, the reaction resistance is prevented from increasing during high cycles.

1. Coating Layer

The coating layer in the present disclosure is a layer that coats at least a part of the surface of the Si-based active material and includes a lithium oxide. The volume change of the lithium oxide due to charge and discharge is usually smaller than that of the Si-based active material. Examples of the lithium oxide may include a material containing a lithium element, a metal element Me, and an oxygen element. Examples of the metal element Me may include Ti and Nb.

As a lithium oxide, lithium titanate is preferable. Lithium titanate is a compound containing Li, Ti, and O, and examples thereof may include $Li_4Ti_5O_{12}$, $Li_4TiO_4$, $Li_2TiO_3$ and $Li_2Ti_3O_7$. It is preferable that the lithium titanate includes at least one of a layered structure and a spinel structure.

The lithium titanate usually has electron conductivity in the state Li is intercalated, and the electron conductivity (25° C.) in the state Li is intercalated is, for example, $8.0*10^{-1}$ S/cm or more. Thus, in the present disclosure, when the coating layer including the lithium titanate adheres to the Si-based active material, the cut-off of the electron conducting path due to expansion and contraction of the Si-based active material can be further inhibited. On the other hand, for example, when short circuit occurs, Li is desorbed from the lithium titanate, and the insulation (shut-down mechanism) thereof is used to shut down the electron conducting path, and thereby the calorific value can be reduced. Incidentally, the electron conductivity (25° C.) of the lithium titanate in the state the intercalated Li is desorbed is, for example, $2.1*10^{-6}$ S/cm or less.

Also, examples of the lithium oxide may include lithium nip bate such as $LiNbO_3$), lithium niobium titanate-based oxide (such as $LiNhTiO_3$), $LiCoVO_4$, $LiMgSnO_4$, and $LiVMoO_6$.

The coating layer may contain just one kind of the lithium oxide, and may contain two kinds or more thereof.

It is preferable that the coating layer includes the lithium oxide as a main body. The proportion of the lithium oxide in the coating yer for example, 70 weight % or more, may be 80 weight % or more and may be 90 weight % or more.

It is preferable that the coating layer includes a Si element derived from a Si-based active material. The reason therefor is to further improve the adhesiveness of the Si-based active material with the coating layer.

The rate of the Si element (molar ratio of Si/Me) in the coating layer with respect to the metal element Me may be 0.1 or more and 0.4 or less, and 0.2 or more and 0.3 or less.

The rate can be calculated from the point analysis of TEM-EDX. If the proportion of the Si element in the coating layer is too little, the adhesiveness of the Si-based active material with the coating layer may be degraded. If the proportion of the Si element is too much, the proportion of the Si-based active material in the coated anode active material would be little, and there is a possibility the energy density may decrease. Also, when the coating layer includes the lithium titanate, electron conductivity of the coating layer may be degraded.

The average thickness of the coating layer is, for example, 5 nm or more, may be 30 nm or more, and may be 50 nm or more. If the coating aver is too thin, there is a risk that the effect of the present disclosure may not be obtained. Meanwhile, the average thickness of the coating layer is, for example, 100 nm or less, may be 80 nm or less, and may be 60 nm or less. The average thickness of the coating layer may be measured by, for example, a transmission electron microscope (TEM).

Figure 5:
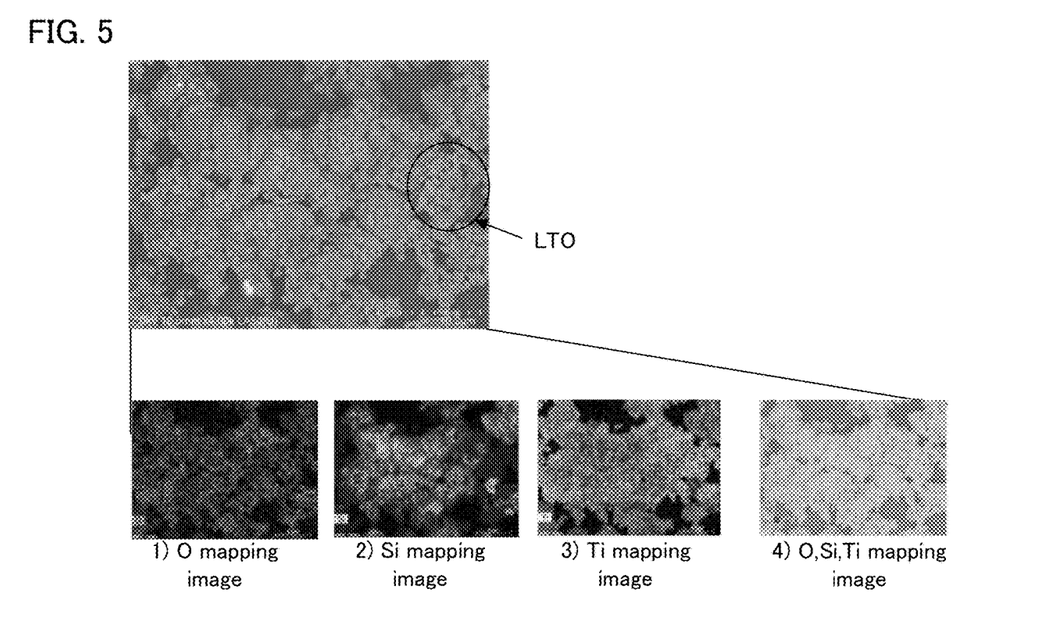
FIG. 5 is an EDX mapping image of the coated anode active material of Example 1.

It is preferable that the coating layer is an aggregate of particles, for example, as shown in FIG. 5. In this case, the average particle size ($D_{50}$) of the particle is, for example, 5 nm or more, may be 30 nm or more, and may be 50 nm or more. Meanwhile, the average particle size ($D_{50}$) of the particle is, for example, 100 nm or less, may be 80 nm or less, and may be 60 nm or less. The average particle size ($D_{50}$) may be calculated from, for example, a measurement with a scanning electron microscope (SEM). Also, when the coating layer is the aggregate of particles, the average particle size of that particle is usually smaller than the average particle size of the Si-based active material.

The coating layer coats at least a part of the surface of the Si-based active material, interposing a silicon oxide layer. The coating layer may be formed partially on the surface of the Si-based active material, and may be formed on the entire surface. Coverage of the Si-based active material by the coating layer is, for example, 70% or more, may be 80% or more, and may be 90% or more. Meanwhile, the coverage may be 100%, and may be less than 100%. The coverage may be confirmed by, for example, HAADF-STEM analysis (High Angle Annular Dark Field Scanning Transmission Electron Microscope anal sis) and EDX analysis (Energy Dispersive X-ray spectroscopy analysis).

The method for forming the coating layer will be described in details in "5. Method for producing coated anode active material" later; thus, the descriptions herein are omitted.

2. Silicon Oxide Layer

The silicon oxide layer is a layer that is formed between the Si-based active material and the coating layer, and that includes a silicon oxide. Whether the silicon oxide layer is formed between the Si-based active material and the coating layer or not can be confirmed by, for example, conducting HAADF-STEM analysis (High Angle Annular Dark Field Scanning Transmission Electron Microscope analysis) and EDX analysis (Energy Dispersive X-ray spectroscopy analysis) to the cross-section of the coated anode active material.

The silicon oxide layer contains a silicon element and an oxygen element, and mainly configured a silicon oxide represented by the general formula: $SiO_x$. The "x" represents the ratio of the silicon and the oxygen, and for example, it is a real number satisfying $0<x<2$, and may be a real number satisfying $0.5 \leq x \leq 1.5$. The proportion f the silicon oxide represented by the general formula $SiO_x$ in the silicon oxide layer for example, weight % or more, may be 80 weight % or more and may be 90 weight % or more.

In the silicon oxide layer, in addition to the silicon element and an oxygen element, a metal element. Me derived from the coating layer is preferably included. The reason therefor is to further improve the adhesiveness of the Si-based active material with the coating layer. The rate (molar ratio of Me/Si) of the metal element Me included in the silicon oxide layer with respect to the Si element is, for example, value larger than 0, may be 0.05 or more, and may be 0.1 or more. If the proportion of the Me element is too little, the adhesiveness may be degraded. Meanwhile, for example, the rate may be 0.5 or less. The rate can be calculated from the point analysis of TEM-EDX. Also, it can be calculated from XPS analysis. The silicon oxide layer may include a lithium element.

The silicon oxide layer is preferably amorphous. If it is amorphous, on the occasion of forming the coating layer on the silicon oxide, dispersion of the metal element Me to the silicon oxide layer easily proceeds, and the adhesiveness of the coating layer with the Si based active material further Improves. Whether the silicon oxide layer is amorphous or not can be confirmed by means such as image analysis by a transmission electron microscope (TEM).

The average thickness of the silicon oxide layer is, for example, 2 nm or more, may be 5 nm or more, and may be 10 nm or more. Meanwhile, the average thickness of the silicon oxide layer is, for example, 20 nm or less and may be 15 nm or less. If the silicon oxide layer is too thin, the adhesiveness of the Si-based active material with the coating layer cannot be secured. Also, if the thickness of the silicon oxide layer is too thick, the proportion of the Si-based active material in the coated anode active material would be little, arid there is a possibility the energy density may decrease.

The silicon oxide layer may be formed partially on the surface of the Si-based active material, and may be formed on the entire surface. The coverage the Si-based active material by the silicon oxide layer is, for example, 70% or more, may be 80% or more and may be 90% or more. Meanwhile, the coverage may be 100%, and may be less than 100%. The coverage may be confirmed by, for example, HAADF-STEM analysis (High Angle Annular Dark Field Scanning Transmission Electron Microscope anal sis) and EDX analysis (Energy Dispersive ray spectroscopy analysis).

The method for forming the silicon oxide layer will be described details in "5. Method for producing coated anode active material" later; thus, the descriptions herein are omitted.

3. Si-Based Active Material

The Si-based active material is an active material containing element. Examples of the Si-based active material may include a simple substance of Si and a Si alloy. The Si alloy preferably contains a Si element as a main component. In the Si alloy, the proportion of the Si element may be, for example, 50 mol %, or more, may be 70 mol % or more, and may be 90 mol % or more. Examples of the si alloy may include a Si—Al-based, alloy, a Si—Sn-based alloy, a Si—In-based alloy, a Si—Ag-based alloy, a Si—Pb-based alloy, a Si—Sb-based alloy, a Si—Bi-based alloy, a Si—Mg-based alloy, a Si—Ca-based alloy, a Si—Ge-based alloy, and a Si—Pb-based alloy. The Si alloy may be a two component alloy, and may be a multi component alloy of three components or more.

It is preferable that the Si-based active material does not include a metal element Me (such as a Ti element) derived from the coating layer. The reason therefor is that there is a possibility that the energy density may be decreased.

Examples of the shape of the Si-based active material may include a granular shape. The average particle size ($D_{50}$) of the Si-based active material is, for example, 10 nm or more, and may be 100 nm or more. Meanwhile, the average particle size ($D_{50}$) of the Si-based active material is, for example, 50 μm or less, and may be 20 μm or less. In the present disclosure, it is preferably 1 μm or more and 10 μm or less. The average particle size ($D_{50}$) may be calculated from, for example, a measurement with a laser diffraction particle distribution meter or a scanning electron microscope (SEM).

4. Coated Anode Active Material

The coated anode active material in the present disclosure is usually used in an all solid state battery. Details of the all solid state battery will be described in "B. All solid state battery" later; thus, the descriptions herein are omitted.

Is the coated anode active material in the present disclosure, the silicon oxide layer and the coating layer are continuously formed in this order on the surface of the Si-based active material. In the present disclosure, it is preferable that the metal element Me derived from the coating layer is dispersed to the silicon oxide layer. Meanwhile, it is preferable that the metal element Me derived from the coating layer is not dispersed to the Si-based active material. Also, Si derived from the i based active material is preferably dispersed to the coating layer. In the present disclosure, it is preferable that the metal element Me derived from the coating layer is dispersed to the silicon oxide layer, and Si derived from the Si-based active material is dispersed to the coating layer. The reason therefor is to further Improve the adhesiveness of the coating layer with the Si-based active material.

Incidentally, the rate (molar ratio of Me/Si)) the metal element Me in the coated anode active material with respect to the Si element may be 0.01 to 0.2. The rate can be calculated from the point analysis of TEM-EDX. Also, it can be calculated from XPS analysis. Incidentally when the rate is 0.05 or more, the coverage of 80% or more can be obtained.

5. Method for Producing Coated Anode Active Material

The coated anode active material in the present disclosure can be produced by, for example, a production method comprising a step of preparing a Si-based active material, a step of forming a precursor layer by pasting a precursor solution of a lithium oxide on a surface of the Si-based active material, and a heat treatment step performing a heat treatment to the precursor layer.

(1) Si-Based Active Material Preparing Step

The Si-based active material may be prepared by synthesizing thereof by oneself, and may be prepared by purchasing the commercial product. The Si-based active material is in the same contents as those described in "A. Coated anode active material"; thus, the descriptions herein are omitted.

In the present disclosure, before the step of forming the precursor layer, a step of forming a silicon oxide layer on the surface of the Si-based active material may be performed in advance. The method for forming the silicon oxide layer is not particularly limited, and examples thereof may include an oxygen plasma treatment, a treatment under oxygen atmosphere, and a treatment with a silane coupling agent. Also, the silicon oxide layer may be formed at the same time of the coating layer in the later described heat treatment step.

(2) Precursor Layer Forming Step

This step is a step of forming a precursor layer by pasting a precursor solution of the lithium oxide on the surface of the Si-based active material. The precursor solution in the present disclosure usually contains a raw material of the lithium oxide and a solvent.

The precursor solution usually contains a Li source of the lithium oxide. Examples of the Li source may include a Li inorganic salt, a Li alkoxide, and a Li hydroxide. Examples of the Li inorganic salt may include a lithium nitrate, a lithium sulfate, and a lithium acetate. Examples of the Li alkoxide may include ethoxy lithium and methoxy lithium. Examples of the Li hydroxide may include a lithium hydroxide.

Examples of the raw material for the lithium oxide may include a metal complex, a metal alkoxide, a metal inorganic salt, and a metal hydroxide. Examples of the metal complex may include a metallate complex, and specific examples may include a peroxo complex of metal, and an oxalate complex of meta. Examples of the peroxo complex of metal may include a peroxo titanate complex. Examples of the metal inorganic salt may include a metal nitrate, a metal sulfate, and a metal acetate.

Examples of the method for preparing the precursor solution containing the peroxo complex of metal may include a method of adding hydrogen peroxide water and ammonia water to a metal oxide. The adding amount of the hydrogen peroxide water and the ammonia water may be appropriately adjusted so as to obtain a transparent solution (uniform solution). In this manner, when the precursor solution contains the hydrogen peroxide, oxidative effect of the hydrogen peroxide causes oxidation of the surface of the Si-based active material, and thereby the silicon oxide layer and the coating layer are formed at the same time after the heat treatment step.

When the precursor solution contains the metal alkoxide, a precursor layer is usually formed by a sol-gel method. In this case, the metal alkoxide will be in a sol state by hydrolysis reaction and polycondensation reaction, and further, will be in a gel state by polycondensation reaction and aggregation.

The kind of the solvent of the precursor solution is not particularly limited, and examples thereof may include alcohol and water. Examples of alcohol may include methanol, ethanol, propanol, and butanol. The solvent of the precursor solution may be mainly composed of alcohol. The proportion of the alcohol in the solvent is preferably 50 mol % or more, may be 70 mol % or more, and may be 90 mol % or more. Also, the solvent of the precursor solution may be mainly composed of water. The proportion of water in the solvent is preferably 50 mol % or more, may be 70 mol % or more, and may be 90 mol % or more.

For example, when the precursor solution contains the metal alkoxide, the solvent is preferably absolute or dehydrated alcohol. Meanwhile, for example, when the precursor solution contains the peroxo complex of metal, the solvent is preferably water.

The method for pasting the precursor solution is not particularly limited, and examples thereof may include a method of soaking the Si-based active material in the precursor solution and agitating and dispersing. After that, powder may be obtained by drying the solvent.

(3) Heat Treatment Step

The heat treatment step in the present disclosure is a step of performing a heat treatment to the precursor layer.

The heat treatment temperature is not particularly limited if the temperature allows one to form the intended coating layer, and for example, the temperature is 100° C. or more, preferably 150° C. or more, and more preferably 200° C. or more. Meanwhile, the heat treatment temperature is, for example, 600° C. or less and preferably 500° C. or less. If the heat treatment temperature is too the silicon oxide layer would be crystallized, and the dispersion of the metal element Me to the silicon oxide layer would not easily proceed, and the adhesiveness of the Si-based active material with the coating layer may be deteriorated. Also, the silicon oxide layer would be thick, and the proportion of the Si-based active material would be little and there is a possibility the energy density may decrease.

The heat treatment time may be appropriately set so as to form the intended coating layer. The heat treatment time— for example, in the range of 30 minutes to 48 hours, and preferably in the range of 1 hour to 20 hours. Also, examples of the heat treatment atmosphere may include an argon atmosphere.

B. All Solid State Battery

Figure 2:
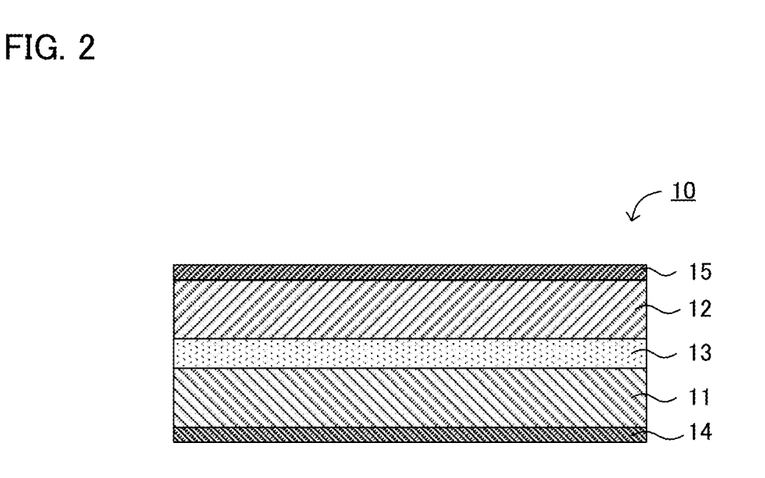
FIG. 2 is a schematic cross-sectional view illustrating an example of the all solid state battery in the present disclosure.

FIG. 2 is a schematic cross-sectional view of the a solid state battery in the present disclosure. All solid state battery 10 illustrated in FIG. 2 includes cathode active material layer 11, anode active material layer 12 including the above described coated anode active material, solid electrolyte layer 13 formed between cathode active material layer 11 and anode active material layer cathode current collector 14 for collecting currents of cathode active material layer 11, and anode current collector 15 for collecting currents of anode active material layer 12.

According to the present disclosure, the anode active material aver contains the above described coated anode active material, and thus the all solid state battery in which the reaction resistance is prevented from increasing during high cycles may be obtained.

1. Anode Active Material Layer

The anode active material layer in the present disclosure contains the above described coated anode active material. The anode active material layer may contain just the coated anode active material as the anode active material, and may contain an additional anode active material. The proportion of the total of the coated anode active material with respect to all the anode active materials included in the anode active material lager is, for example, 50 volume % or more, may be 70 volume or more, and may be 90 volume % or more.

The proportion of the anode active material in the anode active material layer is, for example, 30 volume % or more, and may be 50 volume % or more. If the proportion of the anode active material is too little, there is a possibility that volume energy density may not be improved. Meanwhile, the proportion of the anode active material in the anode active material layer is, for example, 80 volume % or less. If the proportion the anode active material is too much, there is a possibility that excellent electron conducting path and ion conducting path may not be formed.

It is preferable that the anode active material layer contains a solid electrolyte. The reason therefor is to form excellent ion conducting path. Examples of the solid electrolyte may include an inorganic solid electrolyte such as a sulfide solid electrolyte, an oxide solid electrolyte, a nitride solid electrolyte, and halide solid electrolyte.

Examples of the sulfide solid electrolyte may include a solid electrolyte containing a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the halogen element may include a F element, a Cl element, a Br element, and an I element. The sulfide solid electrolyte may be glass (amorphous), and may be a glass ceramic. Examples of the sulfide solid electrolyte may include $Li_2S-P_2S_5$, $LiI-Li_2S-P_2S_5$, $LiI-LiBr-Li_2S-P_2S_5$, $Li_2S-SiS_2$, $Li_2S-GeS_2$, and $Li_2S-P_2S_5$-$GeS_2$.

The anode active material layer may contain a conductive material. Examples of the conductive material may include a carbon material, metal particle, and a conductive polymer. Examples of the carbon material may include a particulate carbon material such as acetylene black (AB) and Ketjen black (KB), and a fiber carbon material such as carbon fiber, carbon nanotube (CNT), and carbon nanofiber (CNF).

The anode active material layer may contain a binder. Examples of the binder may include a fluoride-based binder, a polyimide-based binder and a rubber-based binder. Also, the thickness of the anode active material layer is, for example, 0.1 μm or more and 1000 μm or less.

2. Cathode Active Material Layer

The cathode active material layer in the present disclosure is a layer containing at least a cathode active material. Also, the cathode active material layer may contain at least one of a conductive material, a solid electrolyte, and a binder, as required.

Examples of the cathode active material may include an oxide active material. Examples of the oxide active material may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $LiMn_2O_4$, $Li_4Ti_5O_{12}$ and $Li(Ni_{0.5}Mn_{1.5})O_4$; and an oLtvjne type active material such as $LiFePO_4$, $LiMnPO_4$, $LiNiPO_4$, and $LiCoPO_4$.

A protective layer containing Li-ion conductive oxide may be formed on the surface of the oxide active material. The reason therefor is to inhibit the reaction of the oxide active material with the solid electrolyte. Examples of the Li-ion conductive oxide may include $LiNbO_3$. The thickness of the protective layer is for example, 1 nm or more and 30 nm or less. Also, as the cathode active material, for example, $Li_2S$ can be used.

Examples of the shape of the cathode active material may include a granular shape. The average particle size ($D_{50}$) of the cathode active material is not particularly limited, and for example, it is 10 nm or more, and may be 100 nm or more. Meanwhile, the average particle size ($D_{50}$) of the cathode active material is, for example, 50 μm or less, and may be 20 μm or less.

The conductive material, the solid electrolyte and the binder to be used in the cathode active material layer are in the same contents as those described in "1. Anode active material layer" above; thus, the descriptions herein are omitted. The thickness of the cathode active material layer is, for example, 0.1 μm or more and 1000 μm or less.

3. Solid Electrolyte Layer

The solid electrolyte layer in the present disclosure is a layer arranged between the cathode active material layer and the anode active material layer, and contains at least a solid electrolyte. The solid electrolyte layer preferably contains a sulfide solid electrolyte as the solid electrolyte. Also, the solid electrolyte layer may contain a binder. The solid electrolyte and the binder to be used in the solid electrolyte layer are in the same contents as those described in "1. Anode active material layer" above; thus, the descriptions herein are omitted. The thickness of the solid electrolyte layer is, for example, 0.1 μm or more and 1000 μm or less.

4. All Solid State Battery

The all solid state battery in the present disclosure usually comprises a cathode current collector for collecting currents of the cathode active material yer and an anode current collector for collecting currents of the anode active material layer. Examples of the shape of the cathode current collector and the anode current collector may include a foil shape. Examples of the material for the cathode current collector may include SUS, aluminum, nickel, and carbon. Also, examples of the material for the anode current collector may include SUS, copper, nickel, and carbon.

The all solid state battery in the present disclosure comprises at least one of a power generating unit including a cathode active material layer, a solid electrolyte layer and an anode active material layer, and may comprise two or more of the unit. When the all solid state battery comprises a plurality of the power generating unit, they may be connected in parallel and may be connected series. The all solid state battery in the present disclosure includes an outer package for storing the cathode current collector, the cathode active material layer, the solid electrolyte layer, the anode active material layer and the anode current collector. There are no particular limitations on the kind of the outer package, and examples thereof may include a laminate outer package.

The all solid state battery in the present disclosure may include a restraining jig that applies a restraining pressure along with the thickness direction of the cathode active material layer, the solid electrolyte layer and the anode active material layer. Excellent ion conducting path and electron conducting path may be formed by applying the restraining pressure. The restraining pressure is, for example, 0.1 MPa or more, may be 1 MPa or more, and may be 5 MPa or more. Meanwhile, the restraining pressure is, for example, 100 MPa or less, may be 50 MPa or less, and may be 20 MPa or less.

The all solid state battery in the present disclosure is typically an all solid lithium ion secondary battery. The application of the solid state battery is not particularly limited, and examples thereof may include a power source for vehicles such as hybrid electric vehicles (HEV), plug-in hybrid electric vehicle (PHEV), battery electric vehicles (BEV), gasoline-fueled automobiles and diesel powered automobiles. In particular, it is preferably used as a power source for driving hybrid electric vehicles and battery electric vehicles. Also, the all solid state battery in the present disclosure may be used as a power source for moving bodies other than vehicles (such as rail road transportation, vessel and airplane), and may be used as a power source for electronic products such as information processing equipment.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

The L solid state battery of the present disclosure will be hereinafter explained in more details with reference to Examples and Comparative Examples.

Comparative Example 1

<Production of Anode>

An anode active material (Si particle, average particle size: 2.5 μm), a sulfide solid electrolyte (10LiI—15LiBr—75(0.75Li$_2$S—0.25P$_2$S$_5$), average particle size: 0.5 μm), a conductive material (VGCF) and a binder (SBP) were prepared. These were weighed so as to be the anode active material: the sulfide solid electrolyte: the binder=66.7:31.9:1.3 in the weight ratio, and mixed together with a dispersion medium (diisobutyl keton). VGCF was weighed so as to be 2.5 volume % in the anode active material layer, and projected into the mixture. The obtained mixture was dispersed by an ultrasonic homogenizer (UN-50 from SMT Corporation) to obtain anode slurry. The obtained anode slurry was pasted on an anode current collector (Ni foil), and dried in the conditions of 100° C. for 30 minutes. After that, the product was punched out into the size of 1 cm$^2$ to obtain an anode including an anode active material layer and an anode current collector. The thickness of the anode active material layer was 80 μm.

<Production of Cathode>

A cathode active material (LiNi$_{1/3}$Co$_{1/3}$Mn$_{1/3}$O$_2$), a sulfide solid electrolyte (10LiI—15LiBr—75(0.75Li$_2$S—0.25P$_2$S$_5$)), a conductive material (VGCF), and a binder (PVdF) were prepared. These were weighed so as to be the cathode active material: the sulfide solid electrolyte: the conductive material: the binder=84.7:13.4:1.3: 0.6 in the weight ratio, and mixed together with a dispersion medium (heptane). The obtained mixture was dispersed by an ultrasonic homogenizer (UH-50 from SMT Corporation) to obtain cathode slurry. The obtained cathode slurry was pasted on a cathode current collector (aluminum foil), and dried in the conditions of 100° C. for 30 minutes. After that, the product was punched out into the size of 1 cm$^2$ to obtain a cathode including a cathode active material layer and a cathode current collector. The thickness of the cathode active material layer was 80 μm.

<Production of Solid Electrolyte Layer>

A sulfide solid electrolyte (10LiI—15LiBr—75 (0.75Li$_2$S—0.25P$_2$S$_5$)) was put into a cylindrical ceramic having an inner diameter cross-sectional area of 1 cm$^2$, and pressed at 4 ton/cm$^2$ to obtain a solid electrolyte layer (thickness: 15 μm).

<Production of Evaluation Cell>

The cathode was placed on one side surface of the solid electrolyte layer, and pressed at 1 ton/cm$^2$ (≈98 MPa). Next, the anode was placed on the other side surface of the solid electrolyte layer, and pressed at 4 ton/cm$^2$ (≈392 MPa). Thereby, an evaluation cell was obtained.

Comparative Example 2 and Comparative Example 3

Anode slurry was prepared in the same manner as in Comparative Example 1, except that LTO (Li$_4$Ti$_5$O$_{12}$, average particle size: 0.5 μm) was used as a conductive material in addition to VGCF, and the proportion (volume %) of the LTO (Li$_4$Ti$_5$O$_{12}$) in the anode active material layer was changed to the value shown in Table 1. An evaluation cell was obtained in the same manner as in Comparative Example 1 except that the obtained anode slurry was used.

Example 1

<Synthesis of Coated Anode Active Material>

Si articles (average particle size: 5 μm) was used to synthesize a coated anode active material having the ratio of (Si—SiO$_x$)/LTO≈0.5 g/0.35 g.

First, 1.24 g of CH$_3$COOLi.2H$_2$O powder was put into an eggplant flask. Into the eggplant flask, 20 ml of hydrogen peroxide (concentration: 30 weight %) and 20 ml of ammonia water (concentration: 28 weight %) were added and agitated to be dispersed. Further, 1.47 g of H$_2$TiO$_3$ powder was added to the mixture and agitated for 40 minutes to dissolute. Thereby, light yellow transparent solution including peroxo titanate complex was obtained. This reaction is represented by the below formula (1) and the below formula (2):

and

Next, the eggplant flask containing the light yellow transparent solution was soaked in a water bath at 60° C. and 2 g of Si particles were added to the light yellow transparent solution and agitated for about 35 minutes to be dispersed. Next, the solution was decompressed (60 hPa (0.06 atm)) at 60° C. by a rotary evaporator device to evaporate the solvent. Next, the product was dried at 100° C. and powder was collected. Next, the temperature was raised at the speed of 10° C./min and the product was burned under an Ar gas atmosphere until 600° C. for 5 hours for crystallization eat treatment step). Next, the product was cooled (temperature was dropped natural. Thereby, powder coated anode active material in which a coating lagerincluding the silicon oxide layer and Li$_4$Ti$_5$O$_{21}$ (LTO) was formed on the surface of the Si particles, was obtained.

An anode active material layer was produced in the same manner as in the method of Comparative Example 1, except that anode slurry prepared with the obtained coated anode active material was used, and thereby an evaluation cell was obtained. Incidentally, the proportion. (volume %) of LTO in the anode active material layer is shown in Table 1.

Example 2

A coated anode active material was synthesized in the same manner as in Example 1, except that the blending amount was adjusted to the ratio of (Si—SiO$_x$)/LTO 0.5 g/0.15 g. An anode active material layer was produced in the same manner as in the method of Comparative Example 1, except that anode slurry prepared with the obtained coated anode active material was used, and thereby an evaluation cell was obtained. Incidentally, the proportion (volume %) of LTO in the anode active material layer is shown in Table 1.

[SEM Observation]

Figure 3:
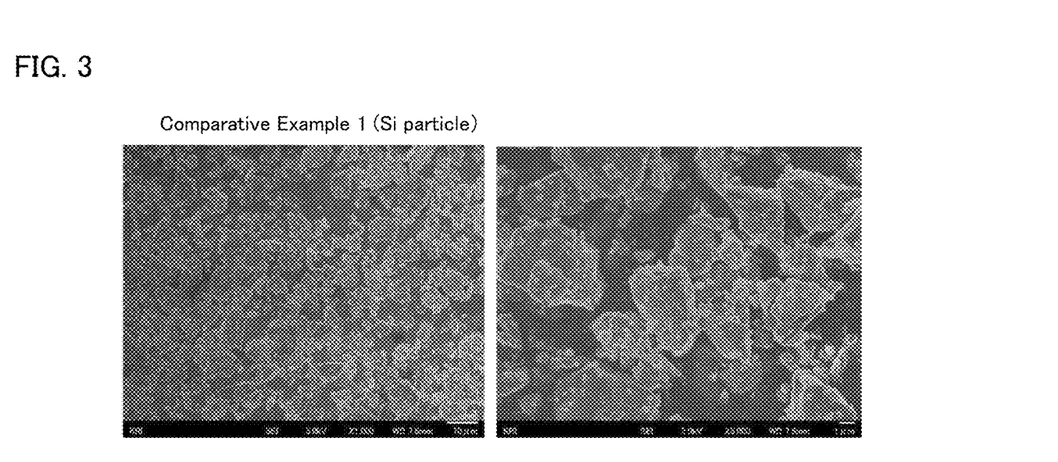
FIG. 3 is an SEM image of the Si particle Comparative Example 1.
Figure 4:
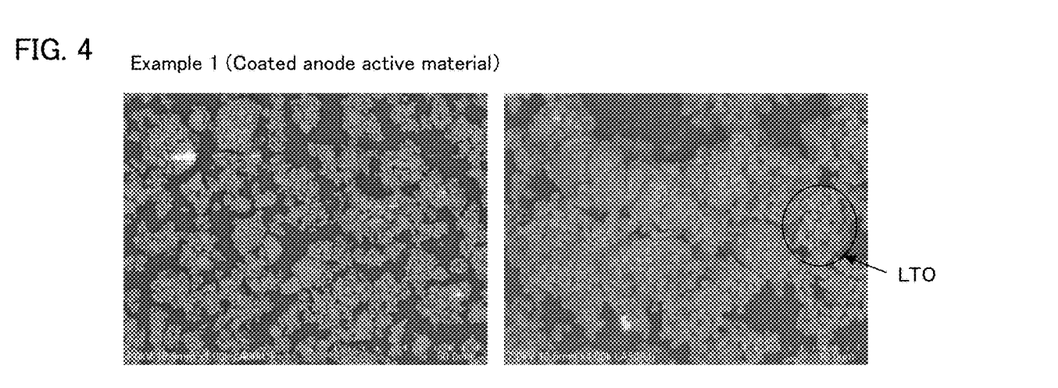
FIG. 4 is an SEM image of the coated anode active material of Example 1.

The Si particle used in Comparative Example 1 and the coated anode active material synthesized in Example 1 were observed by a scanning electron microscope (SEM). SEM images are respectively shown in FIG. 3 and FIG. 4. Also, regarding the coated anode active material synthesized in Example 1, EDX mapping images of an O atom, a Si atom, and a Ti atom were obtained. The results are shown in. FIG. 5. From FIG. 4 and FIG. 5, it confirmed that the coating layer (ETC layer) including lithium titanate formed on the surface of the Si particle.

[HAADF-STEM Observation]

Figure 6:
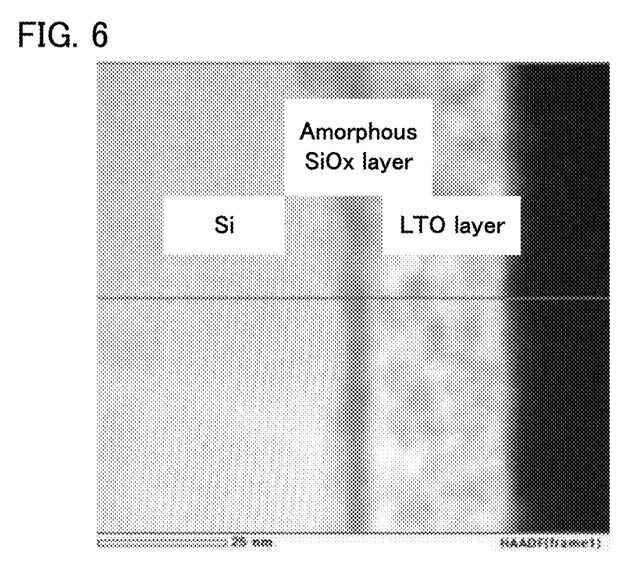
FIG. 6 is a HAADF-STEM image of the coated anode active material of Example 1.
Figure 7:
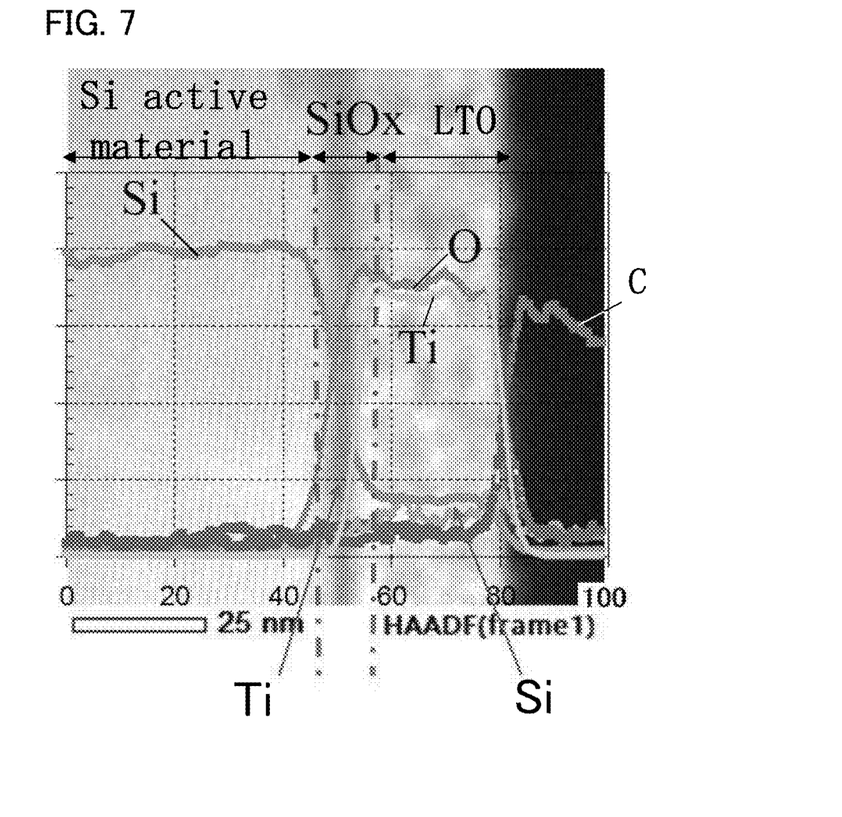
FIG. 7 is the result of a STEM-EDX analysis of the coated anode active material of Example 1.

From the evaluation cell obtained in Example 1, a cross-section sample of the anode layer was prepared, and HAADF-STEM analysis (High Angle Annular Dark Field Scanning Transmission Electron Microscope analysis) and ELX analysis (Eneray Dispersive X-ray spectroscopy analysis) were performed to the cross-section of the coated anode active material. The HAADF-STEM image is shown in FIG. 6. The result of STEM-EDX analysis is shown in FIG. 7. From FIG. 6 and FIG. 7, it was confirmed that the amorphous silicon oxide layer was formed between the particle and the coating layer including lithium titanate. Also, it was confirmed that the amorphous silicon oxide layer included a Ti element, and the LTD layer included a Si element.

[Evaluation Method]

<Capacity Durability>

Charge and discharge test was respectively conduct to the batteries obtained in Comparative Examples 1 to 3 and Examples 1 to 2 for evaluation. The battery was restrained at the constant rate at the restraining pressure of 5 MPa, and CC-CV (constant current—constant voltage) charged at 0.461 mA until 4.35 V. After that, the battery was CC-CV discharged at 0.461 mA until 3.0 V. After that, the all solid state battery was charged again. The charge this time was determined as an initial charge. Cycle was at 2C, and evaluation was conducted until 600 cycles.

The discharge capacity of the first cycle in the cycle test, and the discharge capacity of the 100th cycle were obtained, and the capacity durability was calculated from the below formula:

Capacity durability (%)=(discharge capacity of 1st cycle/ discharge capacity of 100th cycle)*100.

Figure 8:
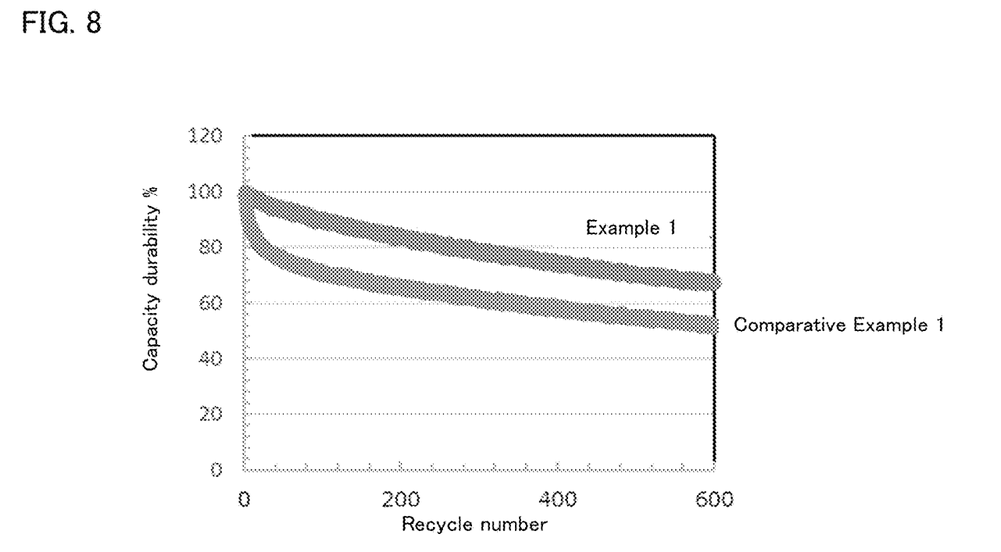
FIG. 8 the results of calculation of capacity durability in each cycle of the batteries of Comparative Example 1 and Example 1.

In the same manner, the capacity durability of the batteries in Comparative Example 1 and Example 1 of the 600th was respectively calculated. The results are shown together in Table 1. Also, the results of the capacity durability of Comparative Example 1 and Example 1 of the 1st cycle to the 600th cycle calculated are shown in FIG. 8.

<Reaction Resistance Increase>

A reaction resistance evaluation was conducted by an impedance method. In specific, to the batteries of Comparative Example 1 and Example 1, after the initial charge and discharge. OCV of the all solid state batteries was adjusted to 3.9 V, A.C. Impedance measurement was conducted thereto, and the Nyquist plot shown in FIG. 9 (initial in FIG. 9) was obtained. The circular arc component obtained from the Nyquist plot was defined as the reaction resistance. Also, the reaction resistance evaluation after 600 cycles (after endurance in FIG. 9) was conducted in the same manner. From the below formula, the reaction resistance increase (times) was calculated. The results are shown in Table 1.

Figure 9:
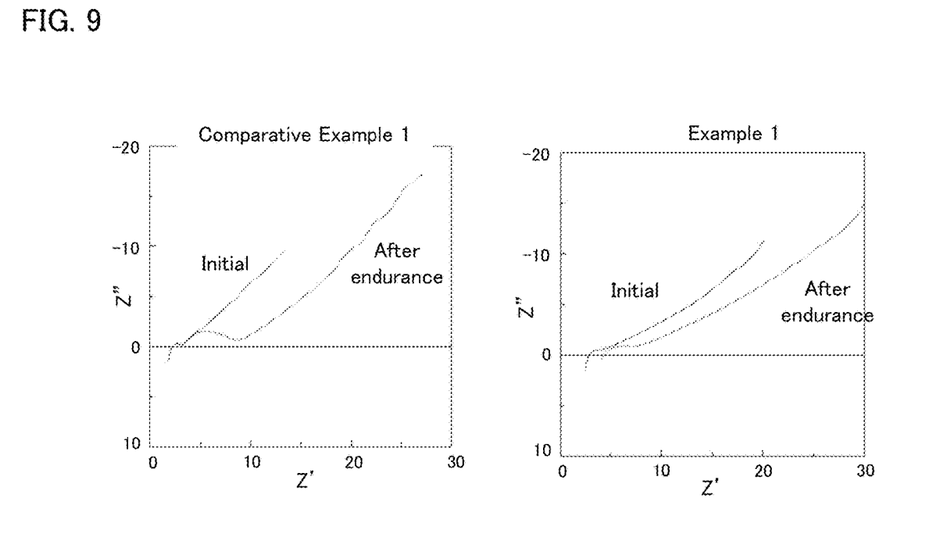
FIG. 9 is the result of impedance measurement of the batteries of Comparative Example 1 and Example 1 after the initial charge and discharge and after endurance.

Reaction resistance increase (times)=reaction resistance after 1 cycle/reaction resistance after 600 cycles

TABLE 1

| | Active material | LTO | Proportion of LTO in anode active material layer [vol %] | 100 cycle capacity durability [%] | 600 cycle capacity durability [%] | Reaction resistance increase [times] |
|---|---|---|---|---|---|---|
| Comp. Ex. 1 | Si active material | LTO not added | 0 | 72 | 51 | 8.2 |
| Comp. Ex. 2 | Si active material | LTO added | 3 | 73 | — | — |
| Comp. Ex. 3 | Si active material | LTO added | 10 | 72 | — | — |
| Example 1 | LTO-coated Si active material | — | 3 | 89 | 67 | 3.45 |
| Example 2 | LTO-coated Si active material | — | 3 | 83 | | |

From the results of Table 1, it was confirmed that the reaction resistance was prevented from increasing during high cycles in the batteries of Example 1 and Example 2, and the capacity durability during high cycles was also high. On the other hand, the capacity durability of the batteries of Comparative Examples 1 to 3 was respectively about 70% and low in the 100th cycle, regardless of whether the LTO was added or not and the amount of LTO. This is presumably because the Si particles once physically separated due to expansion and contraction of Si did not return to contact the LTO particles by just adding LTO, and Si was isolated. On the other hand, in Example 1 and Example 2, the silicon oxide layer is formed between the Si particle and the coating layer, and thus the adhesiveness of the Si particle with the coating layer was well, and the reaction resistance was presumably prevented from increasing during high cycles.

REFERENCE SIGNS LIST 1 coated anode active material
2 Si-based active material
3 coating layer
4 silicon oxide layer
10 all solid state battery
11 cathode active material layer
12 anode active material layer
13 solid electrolyte layer
14 cathode current collector
15 anode current collector

What is claimed is:

1. A coated anode active material comprising:
a Si-based active material; and
a coating layer that coats at least a part of a surface of the Si-based active material and
includes a lithium titanate; wherein
an amorphous silicon oxide layer is formed between the Si-based active material and the coating layer, and
an average particle size ($D_{50}$) of the Si-based active material is 1 μm or more.

2. The coated anode active material according to claim 1, wherein the lithium titanate is $Li_4Ti_5O_{12}$.

3. The coated anode active material according to claim 1, wherein the silicon oxide layer contains a Ti element.

4. The coated anode active material according to claim 1, wherein the coating layer contains a Si element.

5. The coated anode active material according to claim 1, wherein
the coating layer includes the lithium titanate, and
an Si element, and wherein
a molar ratio of the Si element to a Ti element in the coating layer is 0.1 or more and 0.4 or less.

6. An all solid state battery comprising a cathode active material layer, an anode active material layer, and a solid electrolyte layer formed between the cathode active material layer and the anode active material layer; wherein the anode active material layer contains the coated anode active material according to claim 1.

* * * * *